United States Patent
Bohan et al.

[15] 3,665,778
[45] May 30, 1972

[54] ENERGY ABSORBING STEERING COLUMN

[72] Inventors: William J. Bohan, Plymouth; Hani N. Sarafa, Oak Park, both of Mich.

[73] Assignee: Ford Motor Company, Dearborn, Mich.

[22] Filed: Sept. 2, 1970

[21] Appl. No.: 68,838

[52] U.S. Cl. ................................................74/492, 287/119
[51] Int. Cl. .........................................................B62d 1/18
[58] Field of Search ............................287/119; 74/492, 493

[56] References Cited

UNITED STATES PATENTS 1,052,077   2/1913   McMillan............................287/119 X
3,373,629   3/1968   Wight et al. ............................74/492
3,436,107   4/1969   Karden ..............................287/119 X

*Primary Examiner*—Milton Kaufman
*Attorney*—John R. Faulkner and Roger E. Erickson

[57] ABSTRACT

A telescopically collapsible shift tube for use in steering column assembly having an energy absorbing outer jacket. The tube has a resilient retainer positioned between adjoining portions of the inner and outer tube elements. The retainer is radially compressed between the two tube elements to maintain the relative axial position of the elements and to prevent audible vibrations between the elements.

7 Claims, 5 Drawing Figures

Patented May 30, 1972

3,665,778

INVENTORS
HANI N. SARAFA
WILLIAM J. BOHAN
BY John R Faulkner
Roger E Erickson
ATTORNEYS

ENERGY ABSORBING STEERING COLUMN

BACKGROUND AND SUMMARY OF THE INVENTION

Present day motor vehicles generally include steering column assemblies which are deformable and collapsible to absorb energy at a controlled rate. As a part of such a column assembly, the shift tube must also be axially collapsible. Numerous designs have been proposed and utilized for collapsible components, many of which have been subject to noisome vibrations and eventual loosening.

This invention provides a collapsible steering column assembly in which audible vibration between telescoping elements is substantially prevented. Further, the invention provides a construction in which the elements are easy to assemble and adjust and which retain a tight fit throughout the life of the vehicle.

A steering column assembly constructed in accordance with this invention includes a collapsible component having an inner elongate element slidingly and telescopingly received within an outer elongate element. The elements have adjoining portions with cross sectional shapes capable of transmitting a torque. A retainer is positioned between the adjoining portions of the inner and outer elements and provides a resilient force tending to increase the sliding friction between the elements. The retainer includes means constructed to maintain the elements in a normal relative axial position and which are yieldable upon the application of a predetermined force to the steering column to permit telescopic collapse of the column component.

DETAILED DESCRIPTION OF THE PREFERRED EMBODIMENT

Figure 1:
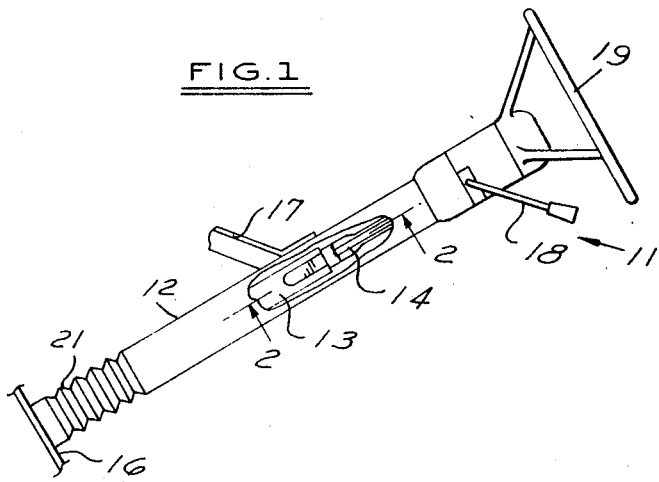
FIG. 1 is a side elevational view with portions removed of a steering column assembly constructed in accordance with the invention.

A steering column assembly 11 as shown in FIG. 1 includes an energy absorbing outer jacket 12 and telescopingly collapsible shift tube and steering shaft assemblies 13 and 14, respectively. The outer jacket, the shift tube and the steering shaft are substantially concentric. Both the steering shaft 14 and the shift tube 13 are rotatable relative to the outer jacket 12 and to each other. The steering column assembly is supported within the vehicle body by a toe plate 16 and by a break-away type bracket 17 connected to the underdash area of the body. The shift tube assembly interconnects a selector lever 18 and the transmission linkage (not shown) providing a means for the vehicle operator to select the desired gear.

The outer jacket 12 is generally cylindrical and includes a plurality of circumferential pleats or folds 21. These folds may be slotted or perforated (not shown) to achieve a desired energy absorption characteristic. An axially directed force applied to the steering wheel 19, if of sufficient magnitude, will cause the pleated portion 21 of the outer jacket to be axially compressed. Upon the axial deformation of the jacket 12, the steering shaft assembly 14 will telescopically collapse in a well known manner, and in accordance with this invention the shift tube assembly 13 will telescopically foreshorten a corresponding amount.

Figure 2:
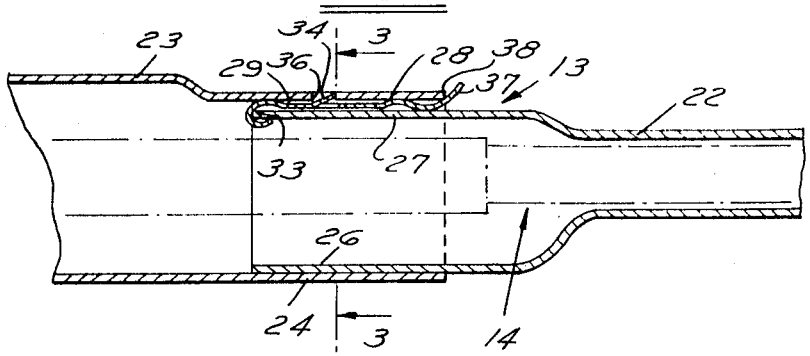
FIG. 2 is a cross sectional view of a portion of the shift tube assembly taken along the plane of 2—2 of FIG. 1.
Figure 4:
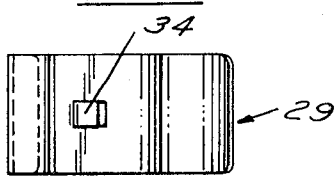
FIG. 4 is a top view of the retainer which connects the upper and lower components of the shift tube assembly.
Figure 3:
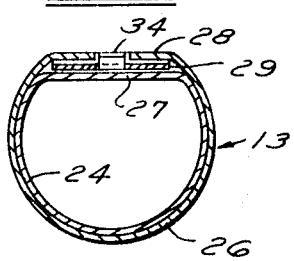
FIG. 3 is an axial cross sectional view of the shift tube assembly taken along the plane of 3—3 of FIG. 2.

A portion of the collapsible shift tube assembly 13 is shown in FIG. 2 of the drawings. An inner tubular element 22 is slidingly and telescopingly received within an outer tubular element 23. The cross sectional shape of each of the tube elements is cylindrical except in the region where the two components are connected as shown in FIG. 3. These cross sectional shapes are generally "D" shaped with cylindrical arc portions 24 and 26 and flat chordal portions 27 and 28. The shape provides a torque transmitting connection between the inner and outer tube elements.

When the shift tube elements 22 and 23 are assembled in accordance with the predetermined normal length of the steering column assembly, a retainer is compressed between the two flat portions 27 and 28 of the shift tube elements.

Figure 5:
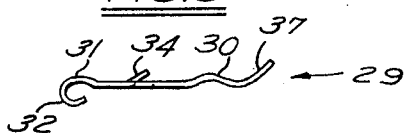
FIG. 5 is a side view of the retainer of FIG. 4.

The curved portions 30 and 31 of the retainer 29 (as shown in FIG. 5) provide a generally radially directed resilient force tending to increase the sliding friction between the telescoping components 22 and 23. One end of the retainer is turned over to form a hook or abutment 32 which engages the end 33 of the inner component.

A tang 34 protrudes from the surface of the retainer and extends radially outwardly into a hole or other recess 36 formed in the outer element. Upon assembly of the inner and outer elements the retainer 29 moves with the inner element 22 until the tang 34 resiliently snaps into hole 36 of outer element 23, thereby defining a normal axial length of the shift tube component.

A tail or abutment 37 of retainer 29 extends axially past and radially outwardly from the joined end 38 of the outer component. The tail is engageable with end 38 to provide abutment means which cooperate with the tang 34 in defining the normal axial length of the shift tube component.

Upon the application of an axial force in excess of a predetermined magnitude to the steering column assembly, the shift tube component will telescopingly collapse causing the retainer 29 to move with the inner component 22, and its tang 34 and tail 37 to be resiliently deformed and drawn between the flat portions 27 and 28 of the tube components.

The retainer 29 is preferably fabricated of a spring steel material, but could be fabricated from any suitable resilient materials including molded plastics.

Further modifications will occur to those skilled in the art which are included in the scope of the following claims.

We claim:

1. A telescopingly collapsible torque transmitting component adaptable for use in an automotive steering column assembly comprising:
   an outer elongate element,
   an inner elongate element slidingly and telescopingly received within the outer element,
   said outer and inner elements having adjoining portions with complementary cross sectional shapes capable of transmitting a torque therebetween, a recess formed in at least one of the adjoining portions,
   a retainer positioned between the adjoining portions of the outer and inner elements including
   a resilient portion exerting a generally radially directed force upon the elements,
   abutment means engaging and extending axially past the adjoined end of one of said elements, and
   at least one protruding portion extending into the recess when said elements are in a normal relative axial position,
   said protruding portion being displaceable from said recess and compressed between said adjoining portions as the elements are telescopingly displaced from the normal relative axial position.

2. A telescopingly collapsible torque transmitting component adaptable for use in an automotive steering column assembly comprising:
   an outer elongate element,
   an inner elongate element slidingly and telescopingly received within the outer element,
   said outer and inner elements having adjoining portions with complementary cross sectional shapes capable of transmitting a torque therebetween,
   a resilient retainer positioned between the outer and inner elements,
   a first portion of said retainer being elastically compressed between said elements and providing a generally radially directed force tending to increase the sliding friction between the two elements, said retainer having a second portion engaging the adjoining end of said inner element and extending radially inwardly therefrom and a third portion engaging the adjoining end of said outer element and extending radially outwardly therefrom, said retainer defining a normal relative axial position of said inner and outer elements, said second and third portions being deformable to permit telescopic displacement of the elements upon application of predetermined axial force to the steering column assembly.

3. A shift tube assembly for an automotive steering column assembly including:

a first tubular element, a second tubular element slidingly and telescopingly received within the first element, said elements each including substantially flat end portions being mutually adjacent and providing a torque transmitting connection between the elements, a recess formed in the flat portion of a first of said elements, a retainer received between said flat portions including a curved portion resiliently tending to increase the separation between said flat portions, said retainer including a protrusion extending into said recess when said elements are in a normal relative axial position, said protrusion being displaceable from said recess upon telescopic collapse of the shift tube, said retainer including abutment means engaging and extending axially past an end of a second of said elements to prevent movement of the retainer relative to said other element upon telescopic collapse of the shift tube assembly.

4. A shift tube according to claim 3 and including:

a portion of the retainer engaging and extending axially past the joined end of said first tubular element and being angularly disposed from the shift tube in a radial direction, said just-mentioned portion providing an elastically deformable abutment preventing telescopic collapse of the tubular elements from the normal relative axial position until a force exceeding a predetermined magnitude is applied to the steering column assembly.

5. An axially collapsible steering column assembly comprising:

an outer jacket and controlled deformation energy absorbing means, means to attach the steering column to the body of an automotive vehicle, a telescopingly collapsible shift tube component rotatably received within said outer jacket comprising an outer tubular element and an inner tubular element slidingly received within said outer element, said outer and inner tubular elements having adjoining portions with complementary cross sectional shapes capable of transmitting a torque therebetween, one of said adjoining portions having a recess formed therein, a retainer positioned between said adjoining portions when the shift tube elements are normally situated, said retainer having a resilient portion compressed between said adjoining portions and an elastically deformable protrusion extending into said recess when the shift tube elements are normally situated, said protrusion being displaceable from said recess and compressible between the inner and outer components as the tube elements are telescopingly collapsed from their normal relative axial position, said retainer including an abutment means engaging and extending axially past an end of one of said tube elements to prevent movement of the retainer relative to said just-mentioned tube element upon axial collapse of said steering column assembly.

6. A telescopingly shaft assembly comprising:

an outer shaft element, an inner shaft element slidingly and telescopingly received within the outer element, a retainer positioned between the overlapping portions of the inner and outer elements, said retainer having a first portion engaging the overlapping end of the inner element and extending radially inwardly therefrom, said retainer having a second portion engaging the overlapping end of the outer element and extending radially outwardly therefrom, the first and second portions acting as abutment means to provide a normal axial position of the inner element relative to the outer element.

7. A shaft assembly according to claim 6 and including:

at least one of said portions of the retainer being elastically deformable to permit the telescopic collapse of the shaft assembly upon application of an axial force in excess of a predetermined magnitude to the shaft assembly.

* * * * *

UNITED STATES PATENT OFFICE
CERTIFICATE OF CORRECTION

Patent No. 3,665,778            Dated May 30, 1972

Inventor(s) William J. Bohan and Hani N. Sarafa

It is certified that error appears in the above-identified patent and that said Letters Patent are hereby corrected as shown below:

Column 2, line 24, delete "joined";

Column 2, line 56, delete "the recess" and substitute -- said recess --;

Column 3, line 22, delete "a first" and substitute -- one --;

Column 4, line 28, following "telescopingly" insert -- collapsible --.

Signed and sealed this 20th day of November 1973.

(SEAL)
Attest:

EDWARD M. FLETCHER, JR.
Attesting Officer

RENE D. TEGTMEYER
Acting Commissioner of Patents